(12) United States Patent
Anderson

(10) Patent No.: US 8,587,711 B2
(45) Date of Patent: Nov. 19, 2013

(54) SMARTPHONE USER INTERFACE VIEWFINDER SYSTEM

(76) Inventor: Paul S Anderson, Milwaukie, OR (US)

( * ) Notice: Subject to any disclaimer, the term of this patent is extended or adjusted under 35 U.S.C. 154(b) by 22 days.

(21) Appl. No.: 13/403,843

(22) Filed: Feb. 23, 2012

(65) Prior Publication Data

US 2013/0222668 A1    Aug. 29, 2013

(51) Int. Cl.
*H04N 5/222* (2006.01)

(52) U.S. Cl.
USPC ............. 348/333.07; 348/333.11; 348/333.01

(58) Field of Classification Search
USPC ............. 348/333.01, 333.07, 333.08, 333.09, 348/333.11, 375, 341
See application file for complete search history.

(56) References Cited

U.S. PATENT DOCUMENTS

| | | | |
|---|---|---|---|
| 6,453,125 B2* | 9/2002 | Shono | 396/287 |
| 7,034,877 B2* | 4/2006 | Schmidt | 348/333.01 |
| 2006/0082682 A1* | 4/2006 | Schmidt | 348/375 |
| 2008/0198253 A1* | 8/2008 | Yanagisawa | 348/333.01 |

\* cited by examiner

*Primary Examiner* — Sinh Tran
*Assistant Examiner* — Zhenzhen Wu
(74) *Attorney, Agent, or Firm* — Mark S. Hubert

(57) ABSTRACT

A system for enhanced operation of a camera that utilizes an adjustable focusing eyepiece assembly that removeably attaches to a small section of the touch sensitive display face of a mobile device such s a smartphone, or mp3 player so as to eliminate all outside light. The small area encapsulated by the eyepiece assembly surrounds a miniaturized camera viewfinder image and the associated control icons that indicate the operation status of the camera as controlled by the operator's finger manipulation on the touch screen through the specialized, associated mobile device software application. The mobile device's camera may be operated much more accurately with this system.

18 Claims, 16 Drawing Sheets

SMARTPHONE USER INTERFACE VIEWFINDER SYSTEM

BACKGROUND OF THE INVENTION

As the cameras built into smart phones have gotten better and better, people are using them more and more. Because the smart phones use their display screen as the viewfinder, it sometimes is very difficult to see clearly what the picture will look like, especially when taking pictures outdoors in bright sunlight. This new invention combines known and new technologies in a unique and novel configuration to overcome the difficulties of taking pictures with a smart phone in bright daylight conditions.

SUMMARY OF THE INVENTION

The general purpose of this invention is to block out light that causes the smart phone's camera display to be difficult to see. With the increased display resolutions of the latest generations of smart phones it is now practical to use a small portion of the display as a viewfinder and an attachable eyepiece to block out external light. This requires two main components: an eyepiece that blocks out light and has a lens that allows a person's eye to focus on a small area of the display screen and a viewfinder software application that reduces the size of the camera display image and provides touch sensitive camera controls with corresponding operational icons that are viewable within the screen area captured by the eyepiece. It is a further purpose of this invention to provide a system for taking pictures on a smart phone or integrated mp3 player or computer tablet that does not require the application of a contact force to the unit's touch screen, thereby eliminating "shutter shake."

DETAILED DESCRIPTION

Eyepiece

Figure 1:
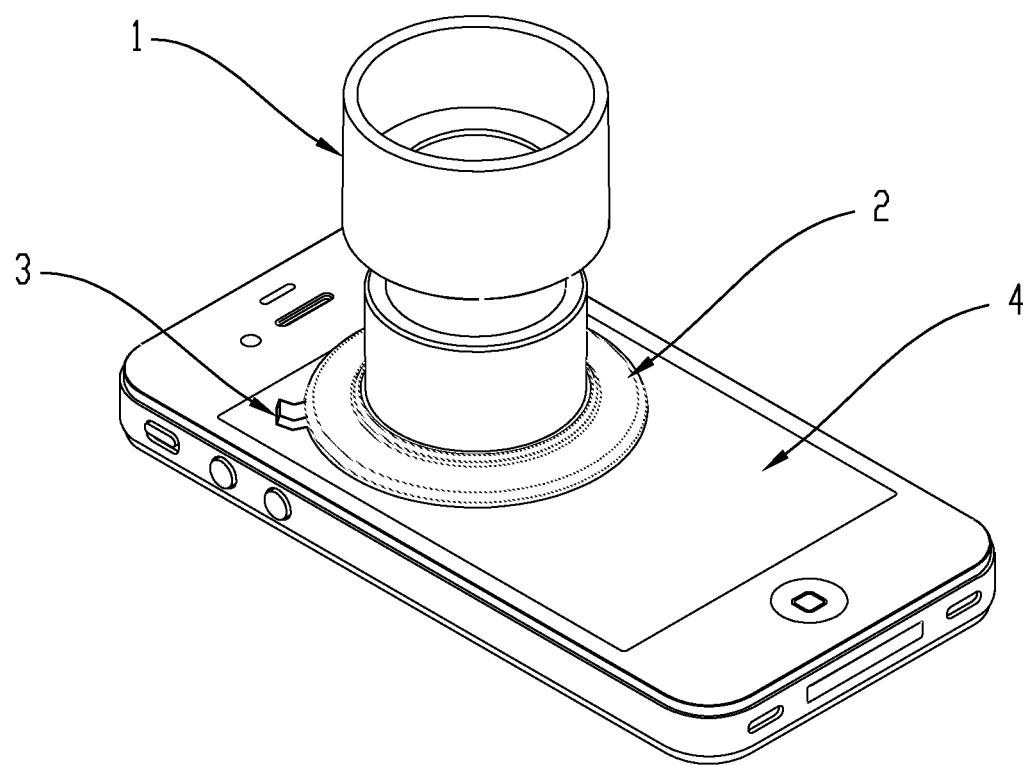
FIG. 1 is an isometric view of the eyepiece attached to a smart phone by suction.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The present invention focuses on a user interface viewfinder system of an adjustable focusing eyepiece assembly 1 that removeably attaches to a small section of the touch sensitive display interface 4 (display face) of a mobile device such s a smartphone, or mp3 player so as to eliminate all outside light and a miniaturized (icon sized) camera operational system. The small area encapsulated by the eyepiece assembly 1 surrounds a miniaturized camera viewfinder image and the associated control icons that indicate the operation status of the camera as controlled by the operator's finger manipulation of touch sensitive camera function controls residing on the touch screen through the specialized, associated mobile device viewfinder application. The mobile device's camera may be operated much more accurately with this system. The viewfinder application may contain instructions, logic, data or code that is stored in memory of the mobile device and affects or initiates action by the mobile device as is well known in the art.

Although there are many ways to attach an eyepiece assembly to the smart phone, such as clamping or having an attachment on a smart phone protective case, this description focuses on two embodiments of different attachment means, the first which uses suction and the second which uses a clip to hold the eyepiece in place. As shown in FIG. 1, the eyepiece assembly 1 is placed on the display face 4 of the smart phone and held in place by the suction cup 2. To attach the eyepiece assembly to the smart phone, a person simply pushes the eyepiece assembly 1 down onto the display face 4 of the smart phone, which forces out a majority of the air from under the suction cup 2. In order to make the eyepiece assembly easier to remove, the suction cup 2 includes a small tab 3 that can be lifted to allow air back under the suction cup 2, facilitating the release of the eyepiece assembly 1.

Figure 2:
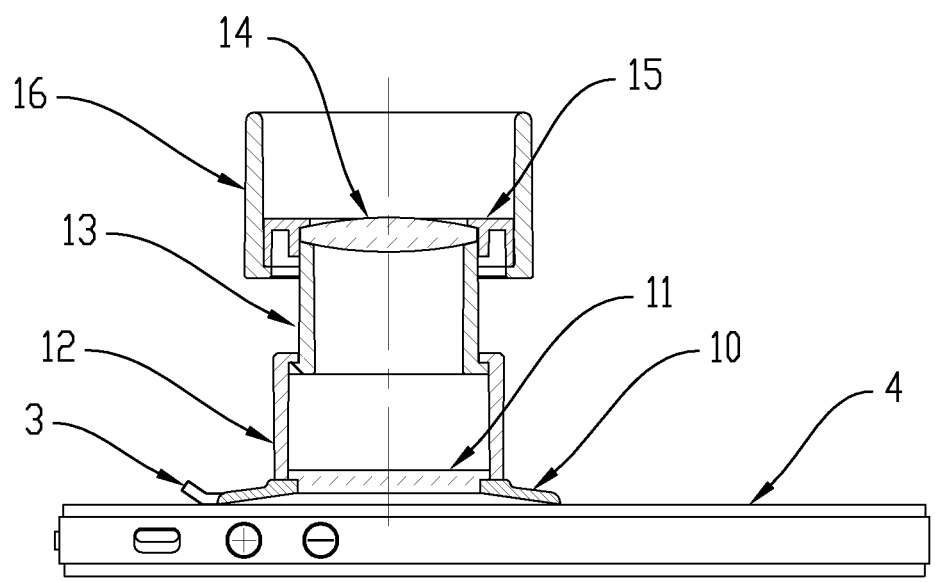
FIG. 2 is a cross-sectional view of the eyepiece in the extended position.

Looking at FIG. 2, the first, preferred embodiment of the eyepiece assembly has a simple suction cup 10 with a molded-in or glued-in flat lens 11. Although this lens 11 does not have to be flat and could be slightly curved, there wouldn't be any advantage to a curved lens. It is preferred to be flat because flat is less expensive. The suction cup 10 is made of a flexible, waterproof polymer with an attachment face that has been fabricated smooth enough to ensure an airtight seal with the display face 4 and minimize any smudging on the display face 4. The joint between the flat lens 11 and the suction cup 10 must also be air tight. The suction cup is preferably constructed of vinyl, polyurethane, or rubber with enough stiffness to lift the flat lens 11 away from the display face 4, hold the lens there in a parallel configuration with the display face 4, and create enough of a vacuum to hold the eyepiece assembly 1 in place.

Affixed normally to the flat lens 11 is the distal end of the hollow lower cylinder 12. On the proximate end of the lower cylinder 12, there is a circumferential interior flange that forms an opening that is slightly smaller in diameter than the inside bore of the remainder of the lower cylinder 12. Through this opening the main body of the hollow upper cylinder 13 is free to extend. On the distal end of the upper cylinder 13 (that which is closest to the flat lens 11), there is a circumferential exterior flange of slightly larger exterior diameter than the exterior of the upper cylinder and the interior diameter of the circumferential interior flange yet smaller than the internal diameter of the lower cylinder, such that the upper cylinder 13 slides in the inside bore of the lower cylinder 12. This exterior flange has flexible extensions on its outer periphery that spring out frictionally engage the inside bore of the lower cylinder 12 so as to hold the upper cylinder in whatever position is needed for proper focusing of the convex lens 14. Since the exterior flange on the upper cylinder 13 is larger than the interior flange on the lower cylinder 12, it stops the upper cylinder 13 from being pulled completely out of the lower cylinder 12. It should be noted that in an alternate embodiment, the outer surface of upper cylinder 13 could have external helical threads on it that could be engaged with matingly conformed internal helical threads on the inside surface of the lower cylinder 12. This would serve to provide precise adjustment and control of the distance from the convex lens 14 to the display face 4 by rotating the upper cylinder 13 as well as frictionally retaining this position relative to the two cylinders.

Figure 3:
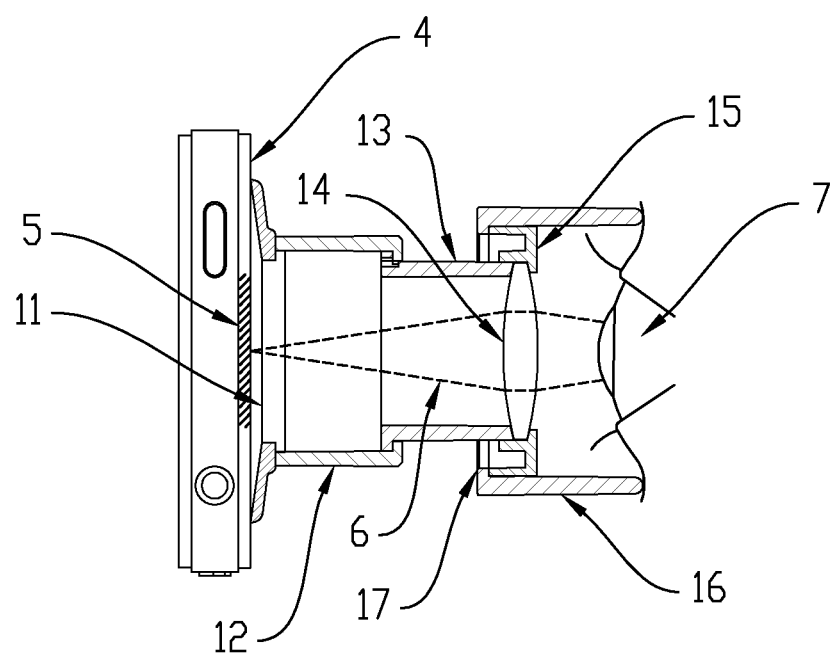
FIG. 3 is a cross-sectional view showing the path of light to a person's eye.

Affixed to the proximate end of the upper cylinder 13 away from the flange is the lens mount ring 15. Trapped between the upper cylinder 13 and the lens mount ring 15 is the convex lens 14. The convex lens 14 is made of glass or clear plastic and is convex in shape so that the eye, as shown in FIG. 3, can focus on the image 5 even though it is only a short distance away. It resides parallel to the flat lens. The ability of the upper cylinder 13 to slide inside the lower cylinder 12 makes the distance between the convex lens 14 and the display face 4 adjustable so as to change the focal point of the eyepiece assembly. This gives a person the ability to adjust the eyepiece assembly to fit his individual eyesight. FIG. 3 shows the lens 14 acting on the path of the light rays 6 going to the eye 7. In order to block outside light from reflecting off of the lens 14 and into the eye 7, the shroud ring 16 slides over the lens mount ring 15 and is prevented from sliding off by its internal lip 17 that abuts the lower face of lens mount ring 15. The lens mount ring 15 has flexible extensions on its outer rim that spring out to frictionally engage the inside bore of the shroud ring 16 so as to hold the shroud ring 16 in position.

Figure 4:
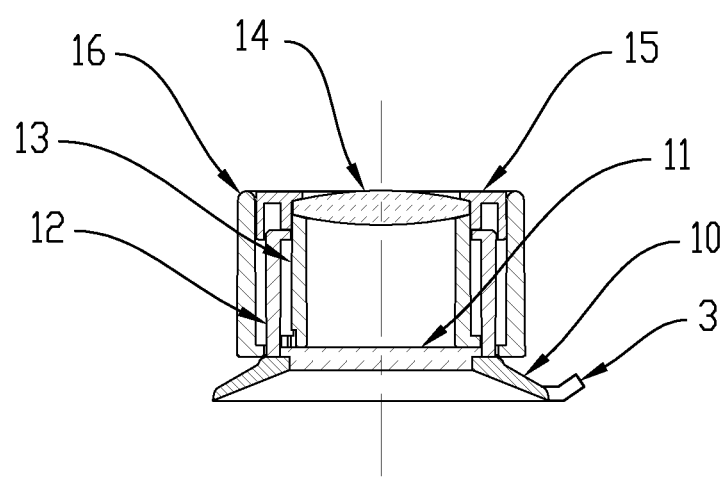
FIG. 4 is a cross-sectional view of the eyepiece in the collapsed position.

All parts except the flat lens 11 and the convex lens 14 should be made of a dark opaque material to block light from the outside and absorb any light from the display that might reflect on the inside of the eyepiece. The shroud ring 16 can be made of a soft, flexible polymer material such as rubber to make it more comfortable against a person's eye. As shown in FIG. 4, the parts of eye-piece assembly can collapseably slide against each other to an overlapping position of minimum height. Although this is not necessary for the eyepiece assembly's functionality as a viewfinder, it is desirable because in this position the eyepiece is small and can be easily put into a person's pocket or purse. A third alternate embodiment (not shown) would be to combine the lower cylinder 12 and upper cylinder 13 into one piece and fix the shroud ring 16 to the lens mount ring 15. This would simplify the assembly, but it would be bulkier and it wouldn't be adjustable for differences in people's eyesight.

Figure 5:
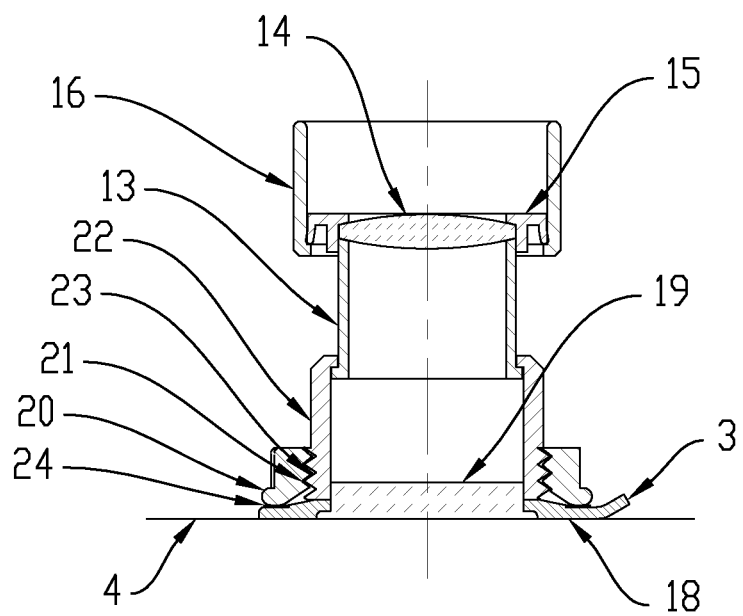
FIG. 5 is a cross-sectional view of an alternate embodiment with a screw lift suction cup eyepiece in the extended position.
Figure 6:
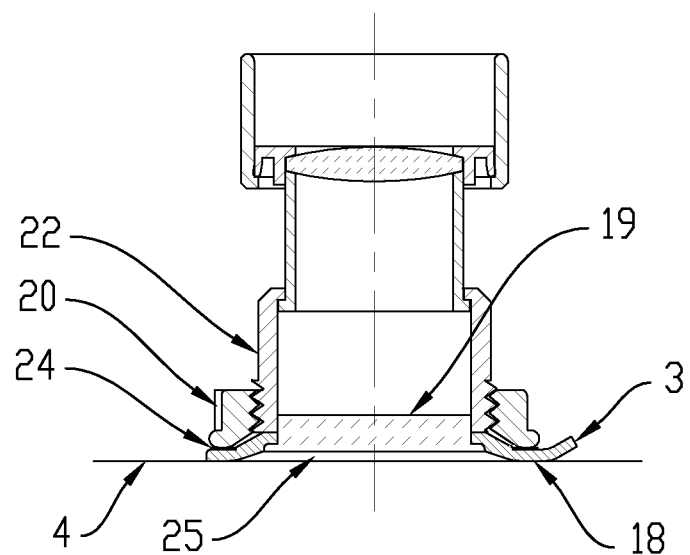
FIG. 6 is a cross-sectional view of an alternate embodiment with the screw lift suction cup in the lifted position.
Figure 7:
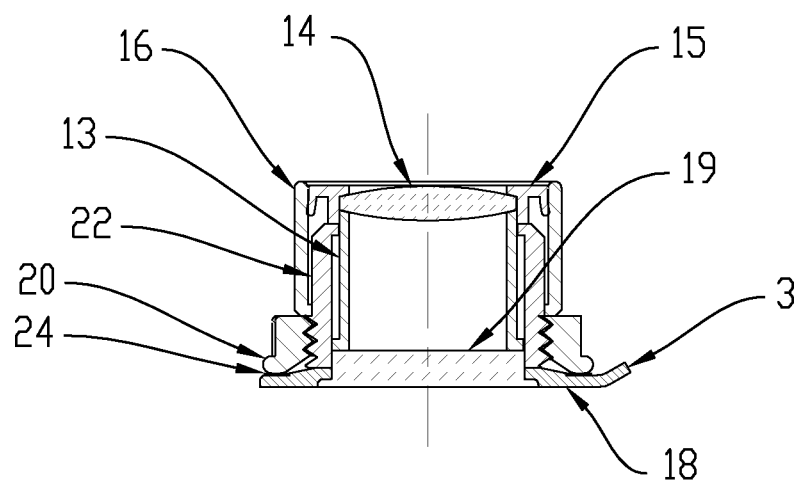
FIG. 7 is a cross-sectional view of an alternate embodiment with a screw lift suction cup eyepiece in the collapsed position.

FIG. 5 shows a third embodiment with a suction cup 18 that is made out of soft rubber molded to the flat lens 19 and uses a jacking nut 20 to lift the flat lens 19 and create a void space under the suction cup 18. The jacking nut 20 has internal helical threads 21 that engage with the external helical threads 23 that are a part of the lower cylinder 22. Turning of the jacking nut 20 with respect to the suction cup 18 causes the lower cylinder 22 to rise and pull the attached flat lens 19 with it. To reduce the friction between the jacking nut 20 and the suction cup 18, there may be placed between them a thin flat washer 24 made of a slippery plastic such as PTFE or polyethylene. The suction cup 18 may be molded with a fabric of suitable material inside or on the top surface to stiffen the suction cup against the twisting action of the jacking nut 20. This aids to flatten out the suction cup thereby reducing the enclosed volume between the suction cup 10, the display face 4 and the flat lens 11. In a further fourth embodiment, this jacking nut arrangement may be utilized in conjunction with the aforementioned third embodiment. Looking at FIG. 6 we can see the space 25 where the partial vacuum is created, resulting in the attachment force. Like the preferred embodiment, the parts of the eyepiece assembly can slide on each other to a minimum position, as shown in FIG. 7, for putting into a pocket or purse.

Figure 8:
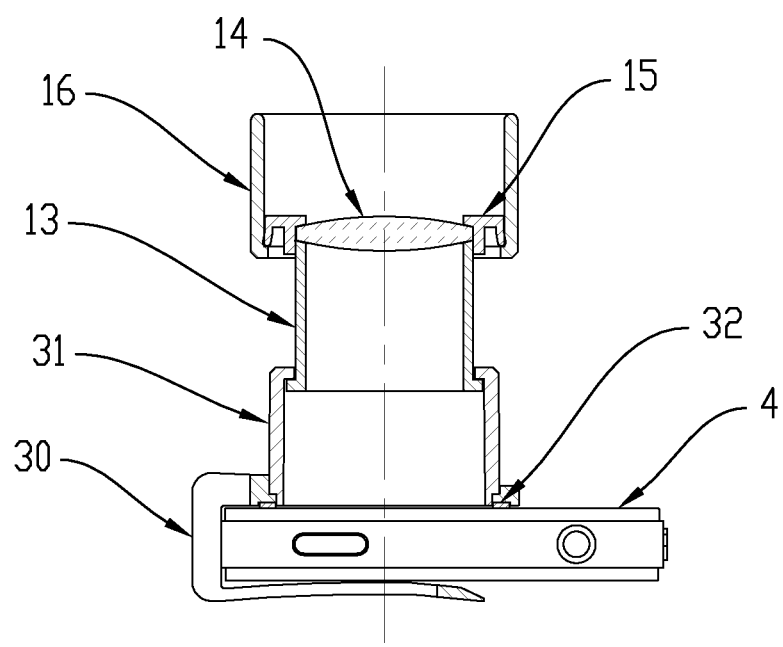
FIG. 8 is a cross-sectional view of an alternate embodiment with a clip-on mount.
Figure 9:
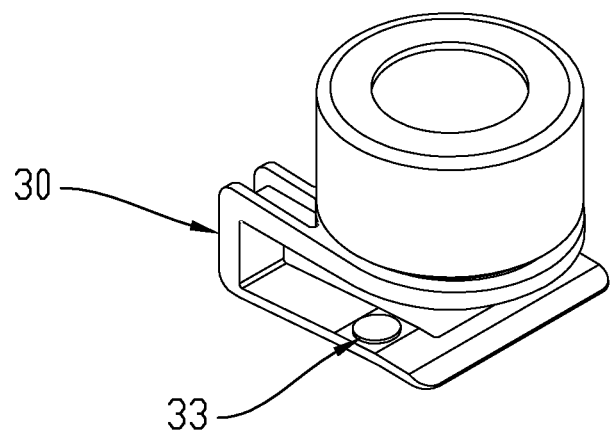
FIG. 9 is an isometric view of an alternate embodiment with a clip-on mount in the collapsed position.

FIG. 8 shows a fifth embodiment that uses a built in clip 30 instead of a suction cup to mechanically attach the eyepiece assembly to the smart phone. In this embodiment the lower cylinder 31 is attached to the clip 30 instead of to a flat lens since a flat lens is not needed. To prevent the eyepiece assembly from sliding on the surface of the smart phone, a rubber gasket 32 is attached to the clip 30 where it contacts the display 4. It is also desirable to attach small felt pads 33, as shown in FIG. 9, to the opposite side of the clip 30 to prevent scratching the outer surface of the smart phone. It is also know that there may be a plethora of attachment devices that are specifically designed to affix the eyepiece assembly to the display face by mechanical attachment to the phone or the phone's protective case. In operation, the eyepiece assembly encloses only a small window of the display face of the mobile device in which is contained the miniaturized camera display image and the associated control icons that indicate the operation status of the camera as set forth in the following section. Preferably, this image is three or four times the size of an icon. The light tight design of the eyepiece assembly allows the user to clearly see what picture is being framed for taking. The ambient lighting is eliminated as well as the glare off of the display face. The status of the camera operation is also displayed on the display face in the area bounded by the eyeglass assembly.

Detailed Description

Application

In order to utilize the eyepiece assembly, the system requires a smart phone with a memory and a touch sensitive user interface display (display face). The smart phone user interface viewfinder system requires operating a mobile application (application or app) that makes an interactive icon based user interface that converts the mobile device's touch sensitive display face 4 into an operational camera viewfinder. The viewfinder application (also known as a mobile app) may be provided as a pre-existing app with the smart phone's operating system or it may be a separate application downloadable to the client's smart phone and configured to work in conjunction with that smart phone's camera control system. The viewfinder application will be stored in the memory of the smart phone and may be provided to the smart phone in any manner known in the art. This viewfinder application may be created by any technique known it the art. For example, the viewfinder application may be created to be compatible with a specific device such as an iPhone, and configured to operate on the iPhone device in its specific computing platform or environment.

The industry standard currently with mobile devices incorporating electronic (digital) cameras is to utilize the entire display face 4 as the viewfinder. This smartphone viewfinder system reduces the size of the camera display image (miniaturizing the image to a size that can completely fit under the area of the display screen bounded by the eyepiece assembly), and also provides touch sensitive camera controls on the remainder of the display screen (outside the area bounded by the eyepiece assembly.) The camera control status icons linked to the touch sensitive camera controls are also displayed in the area beneath or bounded by the eyepiece assembly. Thus, the miniaturized viewfinder image and operational icons are visible through the eyepiece assembly wherein the ambient light does not wash out their image or put a glare on the surface of the display screen. The miniaturized viewfinder image and operational icons may comprise well known features of touch screen graphical user interface technology such as frames, windows, tabs, scrollbars, buttons, icons, menus and fields.

Figure 10:
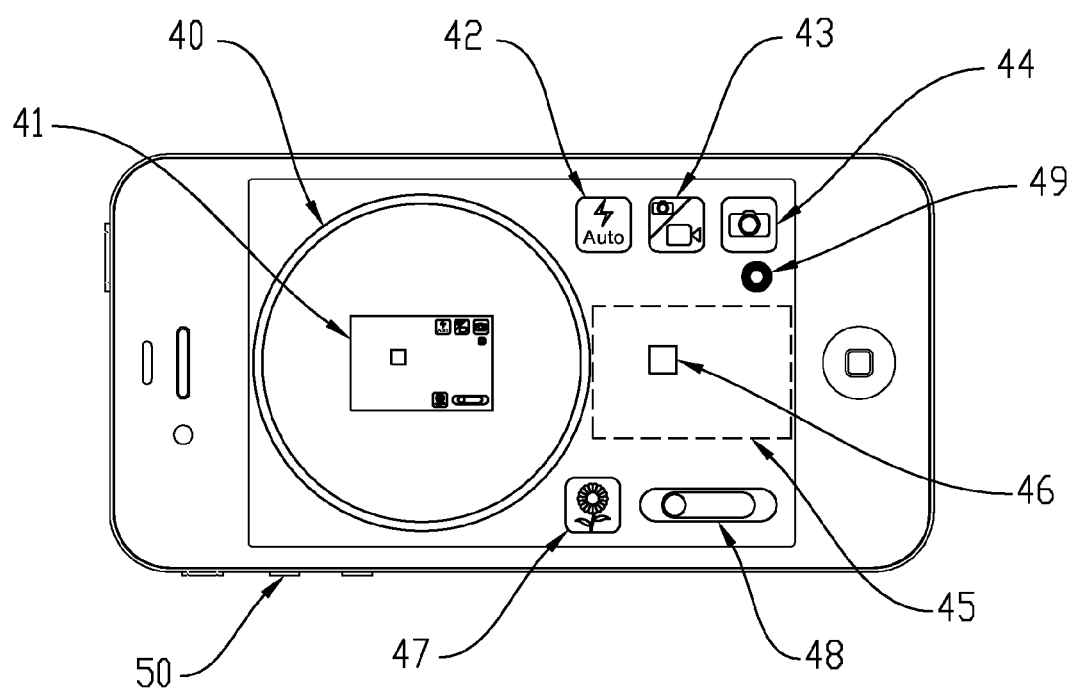
FIG. 10 is a drawing of the smart phone with the viewfinder application running

FIG. 10 shows the layout of the smart phone touch screen display while running the viewfinder application. In order to locate the eyepiece assembly correctly on the display screen, a circle 40 is positioned with its center at the center of the viewfinder display area 41. The viewfinder display area 41 contains a live camera image plus an overlay of small, semi-transparent versions of all of the control buttons located on the rest of the smart phone touch screen display. On the right side of the touch screen display there are three rows of camera controls; the top row of buttons 42, 43, & 44, the middle focus control area 45, and the bottom row of containing button 47 and the slider 48. Button 44 is for picture capture, button 43 is for switching to video mode, button 42 is for setting the flash mode, button 47 is for viewing previously taken pictures and videos, and slider 48 is used to set the amount of zoom.

Figure 11:
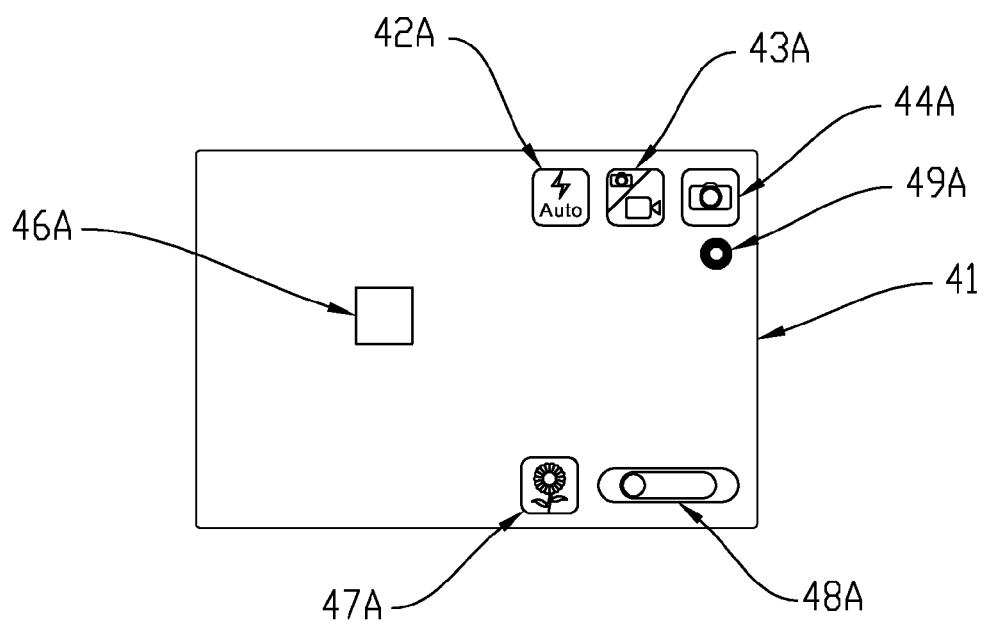
FIG. 11 is a drawing of the viewfinder part of the display that would be seen through the eyepiece while taking still pictures.

Smaller versions of the controls also show up in semi-transparent form in the viewfinder display area 41. In FIG. 11, these small versions of the controls are labeled the same as the full size buttons except that they have an "A" suffix on them.

Unlike all other smart phone applications, a person can't see the control buttons while he is using the application and can't see where his finger is in relation to the buttons he is trying to press. To overcome this obstacle, the application creates a circle 49, representing the location of the person's finger touch in relation to the control buttons. As shown in FIG. 11, the finger location circle 49A shows up in the viewfinder display 41 so that the person can quickly and accurately operate the camera controls. In a typical smart phone application a person taps on a control button to actuate it. In this application, however, the person needs to have his finger touching the display in order to see where it is, so activation of a button has to be done in a different way. When a person wants to actuate a button, he touches the display and drags the circle 49 that represents his finger position over the top of a button and then lifts his finger to actuate that button. This method of actuating controls has the added benefit of reducing "shake" when taking a picture. Lifting one's finger off a small hand held device is less physically disruptive then tapping on it. To aid the person in seeing that the circle is on a button, the button changes color when the circle 49 is on it. If the person drags the circle 49 off of a button before he lifts his finger, the button changes back to its normal color and is not activated.

To take a picture, a person places his finger on the upper part of the screen and drags the finger location circle 49 over the top of the picture capture button 44 at which time it changes color to indicate it is ready to be activated. When the person wants to take the picture he lifts his finger and the picture is captured. On some smart phones, a picture can also be taken by pressing the volume button or other physical button. An example is the volume-up button 50 on the side of the phone as shown in FIG. 10.

The focus control works in much the same way. When the viewfinder application is first started, the camera auto focuses in the center of the view. If the person wants the camera to focus on another part of the view, he places his finger on the focusing area 45 and drags the focus box 46 to the location in the view he wants the camera to focus on. When he lifts his finger the camera focuses on that location.

Figure 12:
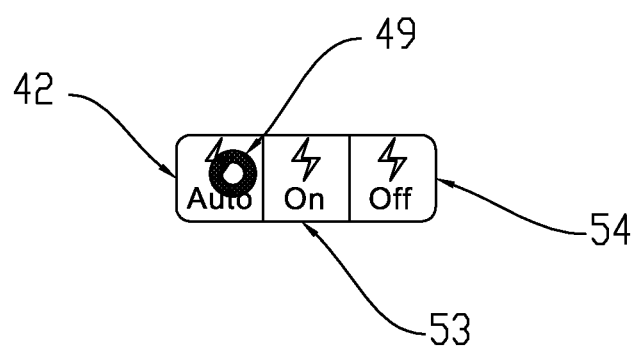
FIG. 12 is a drawing of the flash control pop-out menu.

FIG. 12 shows how the flash mode selection process works: When a person drags the finger position circle 49 over the flash-auto mode button 42, the flash-auto mode button 42 changes color and the flash-on 53 and flash-off 54 buttons appear. If the person wants to turn the flash off, he drags the finger position circle 49 on to the flash-off button 54, at which time the button changes color, and he then lifts his finger. The flash-off button 54 now appears on the display in place of the flash-auto button 42.

Figure 13:
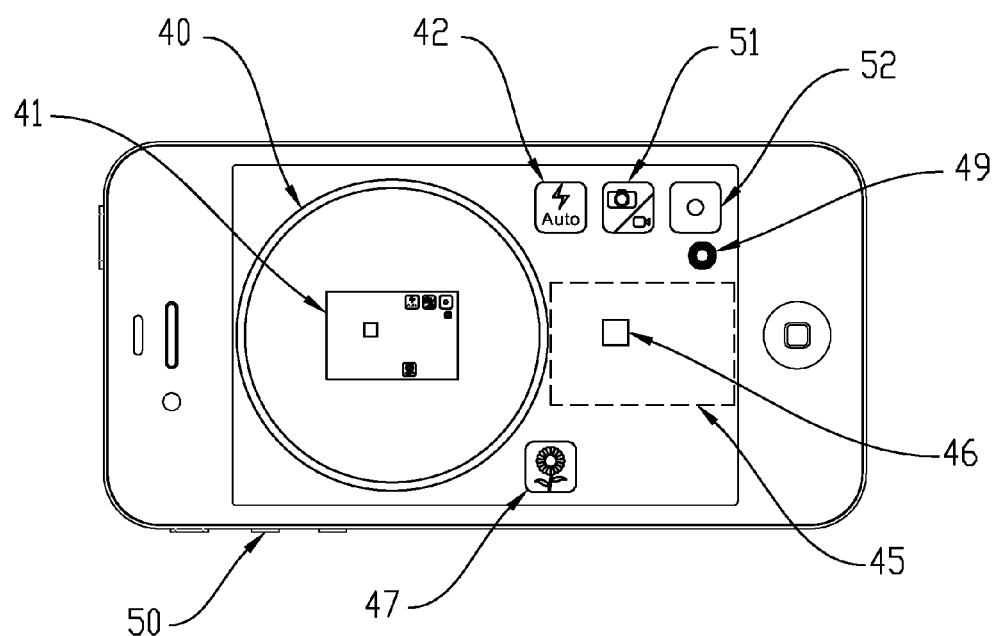
FIG. 13 is a drawing of the display when the application is in video mode.
Figure 14:
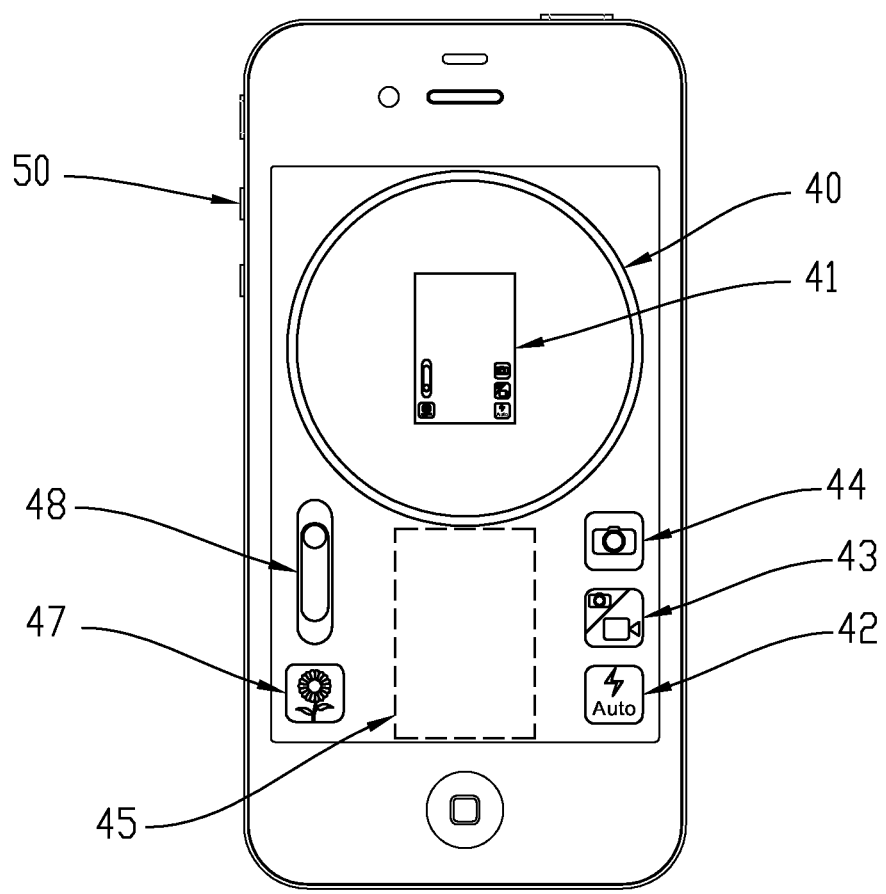
FIG. 14 is a drawing of the control layout when the phone is in the portrait orientation with the eyepiece at the top of the display.
Figure 15:
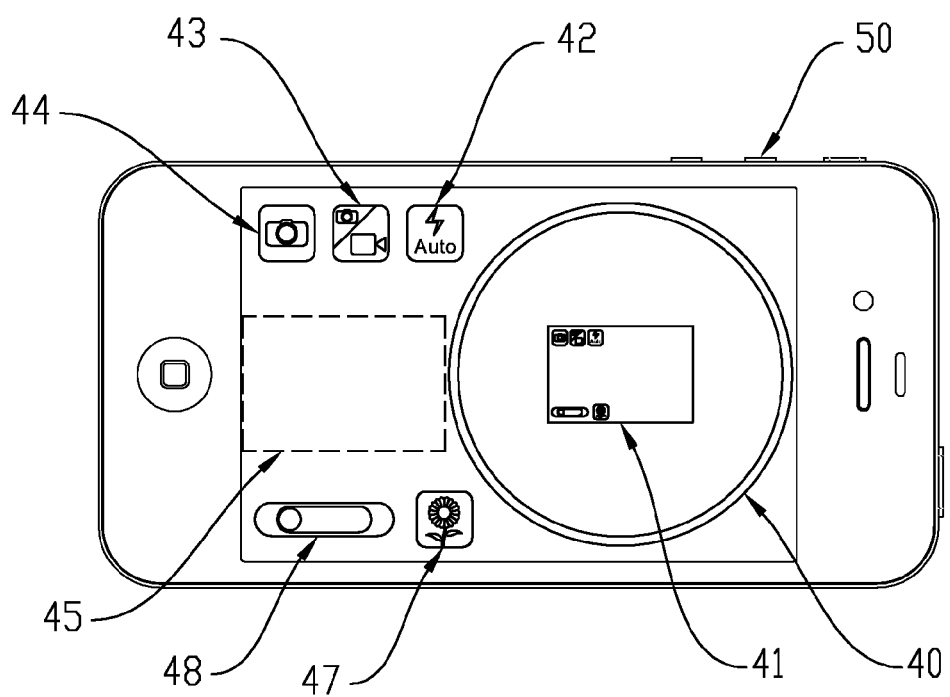
FIG. 15 is a drawing of the control layout when the phone is in the landscape orientation with the eyepiece at the right of the display.
Figure 16:
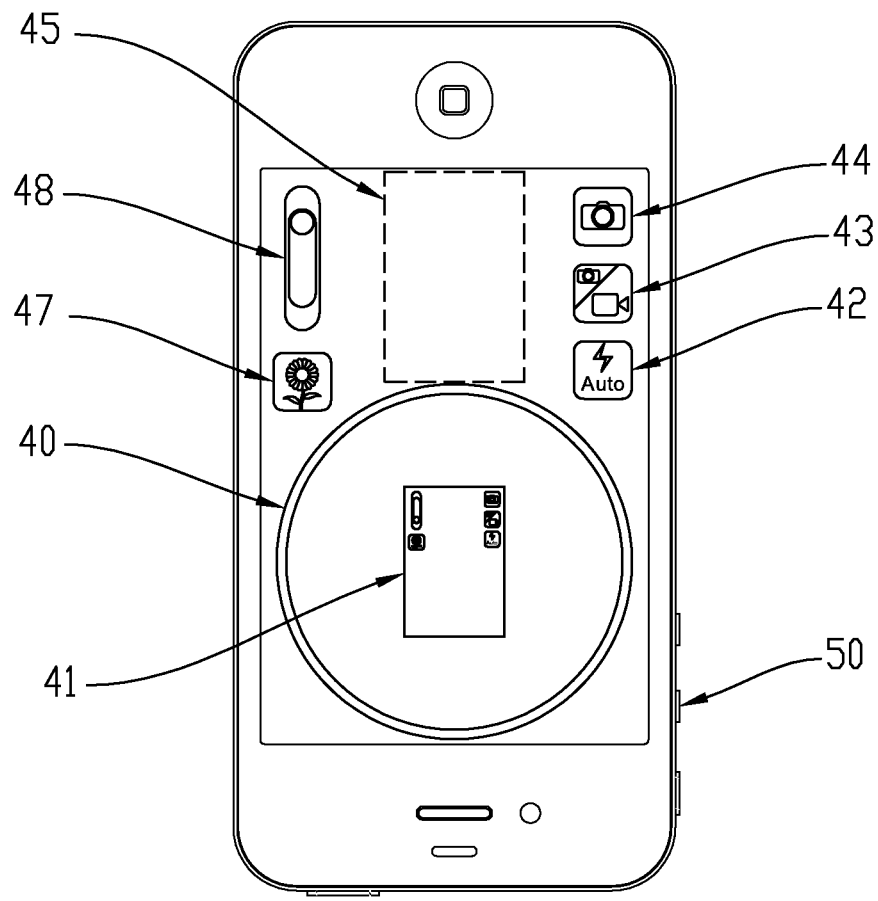
FIG. 16 is a drawing of the control layout when the phone is in the portrait orientation with the eyepiece at the bottom of the display.

To switch to video mode, a person drags the finger position circle 49 to the video mode button 43 and lifts his finger. When the camera switches to video mode, the display looks like FIG. 13. In video mode there is no zoom slider 48 and the video mode button 43 is replaced by the still picture mode button 51 and the picture capture button 44 is replaced by the record button 52. To start recording a video, a person drags the finger position circle 49 on top of the record button 52 and lifts his finger. At this time the dot in the center of the record button turns red and the camera starts recording video. To stop recording, a person drags the finger position circle 49 on top of the record button 52 again and lifts his finger. At this time the dot in the center of the record button turns black and the camera stops recording. The viewfinder application also utilizes the built-in accelerometers to determine the phone's orientation so that it can rotate and reposition the buttons to make the controls easier to use. FIGS. 14, 15, & 16 show possible layouts of the controls for different phone orientations. The application also has a setting for left-handed people. In left-handed mode the positions of the buttons when the phone is in a portrait orientation are swapped left to right to make the more frequently used buttons more accessible to the left hand.

It should also be noted that this invention is not limited to use on smart phones. It could also be used on digital cameras and other devises that have digital cameras such as iPod touches and iPads. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A user interface system for the enhanced operation of the camera function of a mobile device comprising;
   a light excluding eyepiece assembly having a distal end and a proximate end;
   a means for the attachment of said eyepiece assembly to a touch sensitive display face of said mobile device that is affixed to said eyepiece assembly's distal end;
   wherein said eyepiece encapsulates a portion of said display face so as to seal out all light sources except for that of said encapsulated portion when a user's eye is positioned thereon said eyepiece's proximate end wherein said means for attachment is a suction cup; and
   wherein said eyepiece assembly comprises:
      a lower hollow cylinder;
      an upper hollow cylinder that concentrically nestles within said lower cylinder so as to be extendable therefrom;
      a flat lens;
      a convex lens; and
      a shroud ring affixed to said upper cylinder;
      wherein said lower cylinder has a distal end affixed to said suction cup and that houses said flat lens, and said upper cylinder has a proximate end that houses said convex lens in a parallel configuration with said flat lens such that extending said upper cylinder from within said lower cylinder adjusts a focal point of said eyepiece assembly.

2. The user interface system for the enhanced operation of the camera function of a mobile device of claim 1 wherein said eyepiece assembly further comprises a lens mount ring that is affixed to said proximate end of said upper cylinder and houses said convex lens.

3. The user interface system for the enhanced operation of the camera function of a mobile device of claim 2 wherein said suction cup has a lifting tab extending therefrom.

4. The user interface system for the enhanced operation of the camera function of a mobile device of claim 3 wherein said eyepiece assembly further comprises a jacking screw threadingly affixed about the exterior periphery of said distal end of said lower cylinder.

5. The user interface system for the enhanced operation of the camera function of a mobile device of claim 4 further comprising a mobile application stored in a memory of said mobile device that creates visible icons viewable on said touch sensitive display face of said mobile device for the creation of a miniaturized version of a live image viewfinder of said mobile device camera; for a set of touch sensitive camera function controls; and for a miniaturized version of a set of function status indicators corresponding to the operation of camera function controls on said touch sensitive display interface,
   wherein said eyepiece encapsulates a portion of said touch sensitive display interface with said miniaturized version of said camera viewfinder and a miniaturized version of a set of function status indicators thereon, so as to seal out all light sources except for those emanating from said encapsulated portion when a user's eye is positioned thereon said eyepiece's proximate end.

6. The user interface system for the enhanced operation of the camera function of a mobile device of claim 5 wherein said set of touch sensitive camera function controls are located on a part of said touch sensitive display interface that is not encapsulated by said eyepiece.

7. The user interface system for the enhanced operation of the camera function of a mobile device of claim 6 wherein said miniaturized version of a set of function status indicators icons is semi-transparent.

8. The user interface system for the enhanced operation of the camera function of a mobile device of claim 7 wherein any adjustments to said set of touch sensitive camera function controls are made by user finger contact on said touch sensitive display interface, and wherein actuation of said adjustments are implemented into an action of said digital camera by removing said finger contact from said touch sensitive display interface.

9. A digital camera user interface system for a mobile device comprising:
   a mobile device having a digital camera function, a touch sensitive display interface, and a memory, wherein said memory includes a mobile application for the creation of a miniaturized version of a live image viewfinder of a camera in said mobile device, a set of touch sensitive camera function controls, and a miniaturized version of a set of function status indicator icons corresponding to the operation of said camera function controls on said touch sensitive display interface;
   a light excluding eyepiece assembly having a distal end and a proximate end; and
   a means for the attachment of said eyepiece assembly to said mobile device that is affixed to said eyepiece assembly;
   wherein said eyepiece encapsulates a portion of said touch sensitive display interface with said miniaturized version of said live image viewfinder and a miniaturized version of a set of function status indicators thereon, so as to seal out all light sources except for those emanating from said encapsulated portion when a user's eye is positioned thereon said eyepiece's proximate end.

10. The digital camera user interface system for a mobile device of claim 9 wherein said set of touch sensitive camera function controls are located on a part of said touch sensitive display interface that is not encapsulated by said eyepiece.

11. The digital camera user interface system for a mobile device of claim 10 wherein said miniaturized version of a set of function status indicators icons is semi-transparent.

12. The digital camera user interface system for a mobile device of claim 11 wherein any adjustments to said set of touch sensitive camera function controls are made by user finger contact on said touch sensitive display interface, and wherein actuation of said adjustments are implemented into an action of said digital camera by removing said finger contact from said touch sensitive display interface.

13. The digital camera user interface system for a mobile device of claim 12 wherein said means for attachment is a suction cup affixed about said distal end of said eyepiece.

14. The digital camera user interface system for a mobile device of claim 13 wherein said eyepiece assembly comprises:
   a lower hollow cylinder;
   an upper hollow cylinder that concentrically nestles within said lower cylinder so as to be extendable therefrom;
   a flat lens;
   a convex lens; and
   a shroud ring affixed to said upper cylinder;
   wherein said lower cylinder has a distal end affixed to said suction cup and that houses said flat lens, and said upper cylinder has a proximate end that houses said convex lens in a parallel configuration with said flat lens such that extending said upper cylinder from within said lower cylinder adjust a focal point of said eyepiece assembly.

15. The digital camera user interface system for a mobile device of claim 14 wherein said eyepiece assembly further comprises a lens mount ring that is affixed to said proximate end of said upper cylinder and houses said convex lens.

16. The digital camera user interface system for a mobile device of claim 15 wherein suction cup has a lifting tab extending therefrom.

17. The digital camera user interface system for a mobile device of claim 16 wherein said eyepiece assembly further comprises a jacking screw threadingly affixed about the exterior periphery of said distal end of said lower cylinder.

18. A digital camera user interface system for a mobile device comprising:
- a mobile device having a digital camera function, a touch sensitive display interface, said interface displaying a miniaturized version of a live image viewfinder of a camera in said mobile device, a set of touch sensitive camera function controls, and a miniaturized version of a set of function status indicator icons corresponding to the operation of said camera function controls on said touch sensitive display interface;
- a light excluding eyepiece assembly having a distal end and a proximate end; and
- a means for the attachment of said eyepiece assembly to said mobile device that is affixed to said eyepiece assembly;
- wherein said eyepiece encapsulates a portion of said touch sensitive display interface with said miniaturized version of said live image viewfinder and a miniaturized version of a set of function status indicators thereon, so as to seal out all light sources except for those emanating from said encapsulated portion when a user's eye is positioned thereon said eyepiece's proximate end.

* * * * *